United States Patent
Lee

(10) Patent No.: US 10,558,910 B2
(45) Date of Patent: Feb. 11, 2020

(54) NEUROMORPHIC DEVICE AND METHOD OF ADJUSTING A RESISTANCE CHANGE RATIO THEREOF

(71) Applicant: SK hynix Inc., Icheon (KR)

(72) Inventor: Hyung-Dong Lee, Icheon (KR)

(73) Assignee: SK hynix Inc., Icheon (KR)

( * ) Notice: Subject to any disclaimer, the term of this patent is extended or adjusted under 35 U.S.C. 154(b) by 528 days.

(21) Appl. No.: 15/385,599

(22) Filed: Dec. 20, 2016

(65) Prior Publication Data
US 2017/0193354 A1  Jul. 6, 2017

Related U.S. Application Data

(60) Provisional application No. 62/273,242, filed on Dec. 30, 2015.

(30) Foreign Application Priority Data

Sep. 22, 2016  (KR) .......................... 10-2016-0121541

(51) Int. Cl.
*G06N 3/04*  (2006.01)
(52) U.S. Cl.
CPC .................................... *G06N 3/049* (2013.01)
(58) Field of Classification Search
CPC ........ G06N 3/049; G06N 3/0635; G06N 3/088
See application file for complete search history.

(56) References Cited

U.S. PATENT DOCUMENTS

| | | | |
|---|---|---|---|
| 8,527,438 B2 | 9/2013 | Jackson et al. | |
| 2014/0067743 A1* | 3/2014 | Park | G06N 3/049 706/33 |
| 2014/0129498 A1* | 5/2014 | Bichler | G06N 3/049 706/25 |
| 2017/0083810 A1* | 3/2017 | Ielmini | G06N 3/063 |

FOREIGN PATENT DOCUMENTS

KR  10-2014-0141778 A  12/2014

OTHER PUBLICATIONS

Soudry et al, Memristor-Based Multilayer Neural Networks With Online Gradient Descent Training, Jan. 14, 2015, IEEE, IEEE transactions on neural networks and learning systems vol. 26, issue 10, pp. 2408-2421 (Year: 2015).*

* cited by examiner

*Primary Examiner* — Austin Hicks

(57) ABSTRACT

A neuromorphic device may include: a plurality of pre-synaptic neurons; row lines extending in a row direction from the plurality of pre-synaptic neurons; a plurality of post-synaptic neurons; column lines extended in a column direction from the plurality of post-synaptic neurons; a plurality of synapses arranged at intersections between the row lines and the column lines; a plurality of first control blocks; and first control lines extending from the control blocks. The first control lines may be electrically connected to the plurality of synapses.

13 Claims, 14 Drawing Sheets

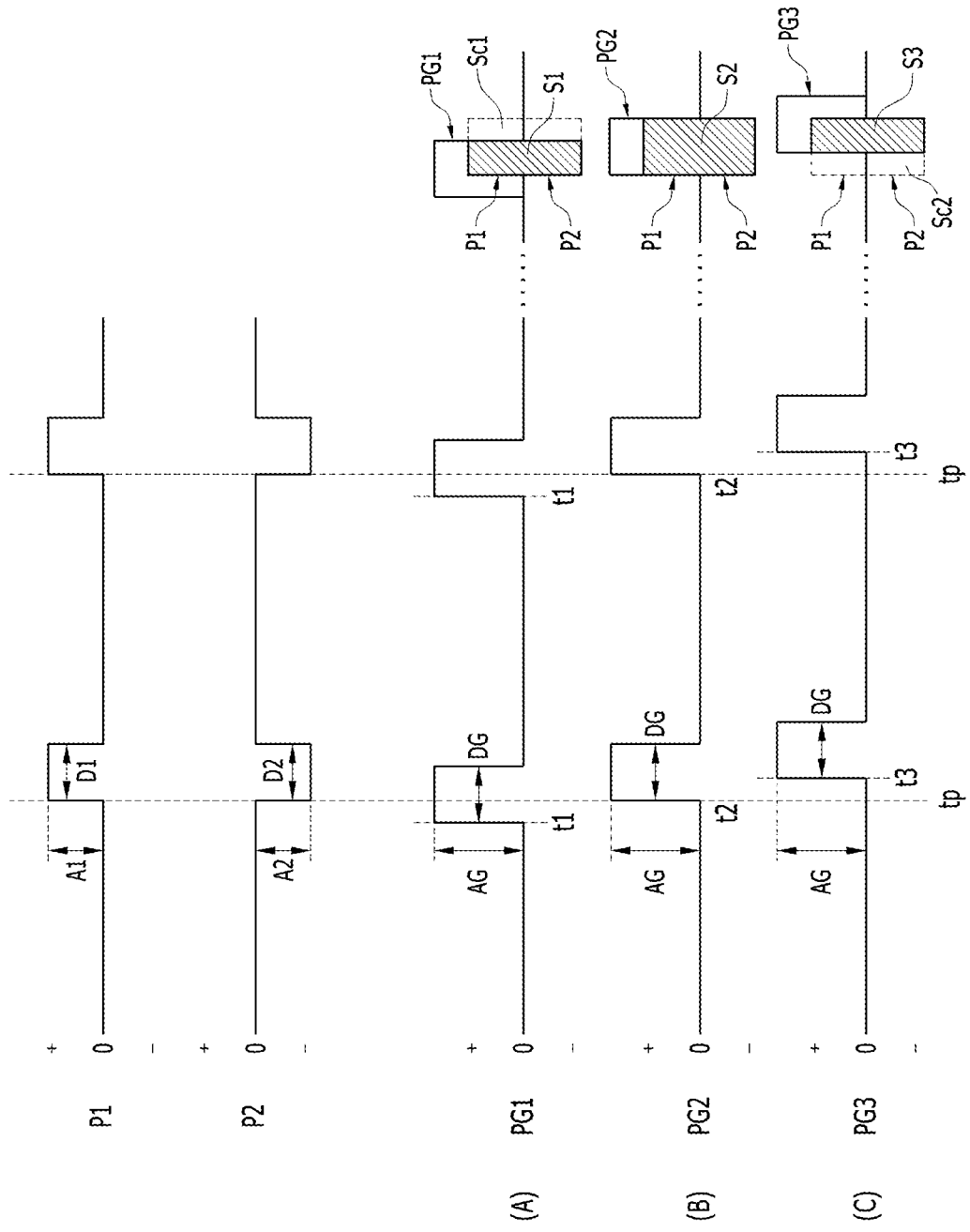

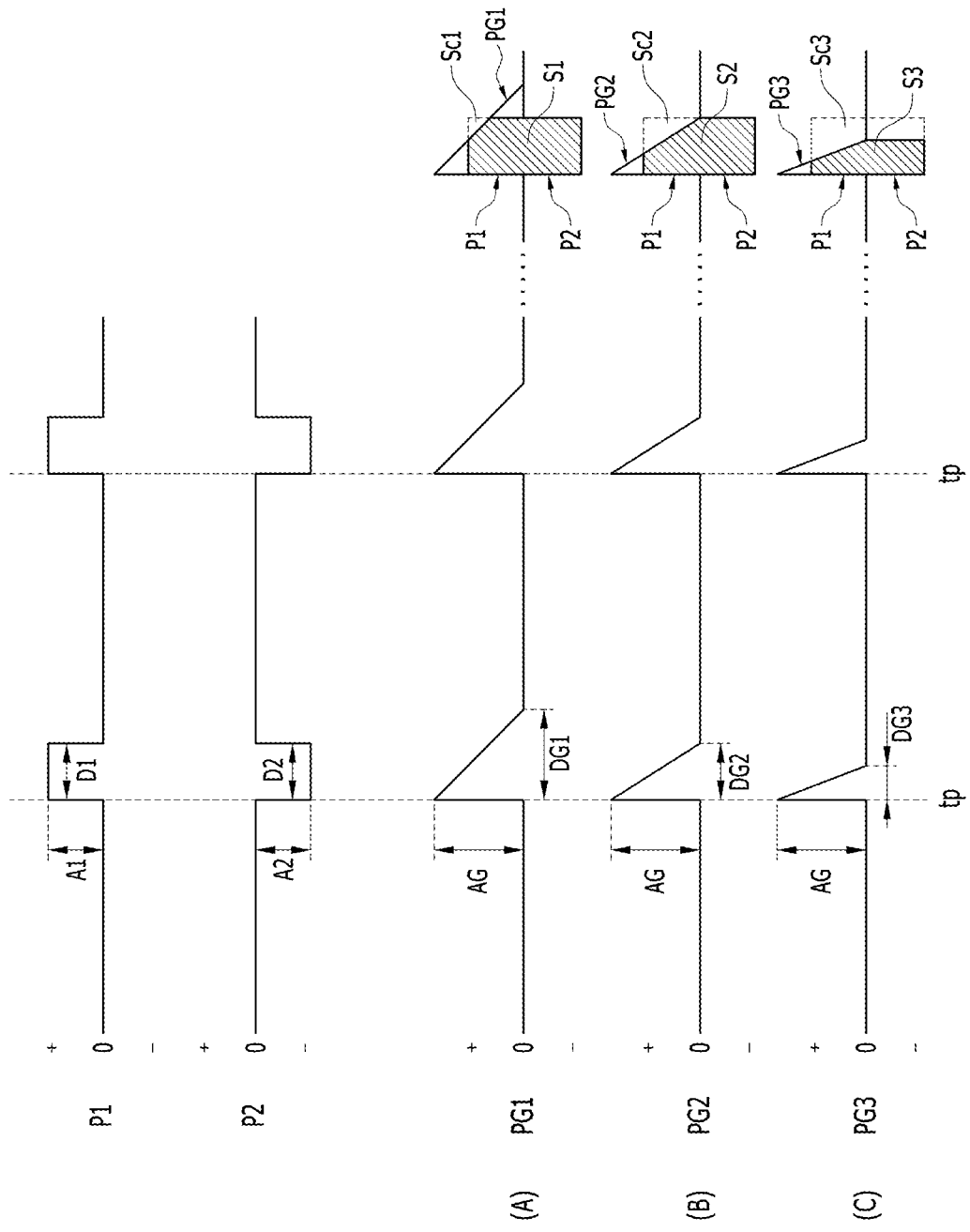

NEUROMORPHIC DEVICE AND METHOD OF ADJUSTING A RESISTANCE CHANGE RATIO THEREOF

CROSS-REFERENCE TO RELATED APPLICATIONS

The present application claims priorities of U.S. Provisional Application No. 62/273,242, filed on Dec. 30, 2015, and Korean Patent Application No. 10-2016-0121541, filed on Sep. 22, 2016, which are incorporated herein by reference in their entirety.

BACKGROUND

1. Field

Exemplary embodiments of the present disclosure relate to a neuromorphic device and a method of adjusting a resistance change ratio thereof, and more particularly, to a neuromorphic device that includes a synapse having a transistor and a memristor, and a method of adjusting a resistance change ratio of the synapse in the neuromorphic device using a gating pulse.

2. Description of the Related Art

Recently, much attention has been paid to neuromorphic technology using chips that mimic the human brain. A neuromorphic device used in the neuromorphic technology includes a plurality of pre-synaptic neurons, a plurality of post-synaptic neurons, and a plurality of synapses. The neuromorphic device outputs pulses or spikes depending on various levels, amplitude, or times, according to learning states of the neuromorphic device. A learning level of a synapse in the neuromorphic device may be set by changing a resistance value of the synapse to various levels.

In order to change the resistance value of a synapse, Spike Timing-Dependent Plasticity (STDP) has been proposed. STDP refers to a method of changing a resistance value of a synapse according to an integrated value of an overlap time between a pre-synaptic pulse and a post-synaptic pulse. However, it is difficult to finely control the overlap time between the pre-synaptic pulse and the post-synaptic pulse. Thus, it is also difficult to lower a resistance change ratio of the synapse, and to improve the learning and recognition ability of a neuromorphic device including the synapse.

SUMMARY

Various embodiments are directed to a neuromorphic device capable of adjusting a resistance change ratio of a synapse.

Also, various embodiments are directed to a method of adjusting a resistance change ratio of a synapse.

In an embodiment, a neuromorphic device may include: a plurality of pre-synaptic neurons; row lines extending in a row direction from the plurality of pre-synaptic neurons; a plurality of post-synaptic neurons; column lines extending in a column direction from the plurality of post-synaptic neurons; a plurality of synapses arranged at intersections between the row lines and the column lines; a plurality of first control blocks; and first control lines extending from the control blocks. The first control lines may be electrically connected to the plurality of synapses.

Each of the plurality of synapses comprises a first transistor and a memristor.

A gate electrode of the first transistor may be electrically connected to a corresponding one of the first control lines. A drain electrode of the first transistor may be electrically connected to a corresponding one of the row lines. A source electrode of the first transistor may be connected to a first electrode of the memristor. A second electrode of the memristor may be electrically connected to a corresponding one of the column lines.

Each of the plurality of synapses may further include a second transistor connected in parallel to the first transistor.

The drain electrode of the first transistor may be connected to a drain electrode of the second transistor. The source electrode of the first transistor may be connected to a source electrode of the second transistor.

The neuromorphic device may further include: a second control line connected to a gate electrode of the second transistor; and a second control block connected to the second control line.

The column lines and the first control lines may be arranged parallel to each other, and each of the plurality of synapses may be connected to one of the column lines and one of the first control lines as well as a corresponding one of the first control lines.

Each of the first control blocks comprises a pulse generation circuit and a timing controller.

In an embodiment, a method of adjusting a resistance change ratio of a neuromorphic device may include: inputting a first pulse from a pre-synaptic neuron to a drain electrode of a first transistor of a synapse through a row line; inputting a first pulse provided by a pre-synaptic neuron to a drain electrode of a transistor of a synapse through a row line; inputting a second pulse provided by a post-synaptic neuron to a second electrode of a memristor through a column line, the memristor having a first electrode connected to a source electrode of the transistor of the synapse; and inputting a gating pulse provided by a control block to a gate electrode of the transistor through a control line.

The gating pulse may have a rectangular shape.

The gating pulse may include one of N pulses having different voltage levels from the first pulse. The N may be a positive integer larger than 1.

The gating pulse may include one of N pulses having different generation times from the first pulse.

The gating pulse may include one of N pulses having different durations from the first pulse.

The gating pulse may have a triangular shape.

The gating pulse may include one of N pulses having different voltage levels from the first pulse. The N may be a positive integer larger than 1.

The gating pulse may include one of N pulses having different generation times from the first pulse.

The gating pulse may include one of N pulses having different voltage levels from the first pulse.

The gating pulse may include one of N pulses having different durations from the first pulse.

The first pulse may be inputted to the drain electrode of the transistor at a first time. The second pulse may be inputted to the second electrode of the memristor at a second time. The gating pulse may be inputted to the gate electrode of the transistor at a third time. The first pulse, the second pulse, and the gating pulse may be input to overlap with one another.

In an embodiment, a method of adjusting a resistance change ratio of a neuromorphic device may include: inputting a first pulse provided by a pre-synaptic neuron to a drain electrode of a first transistor of a synapse through a row line; inputting a second pulse provided by a post-synaptic neuron to a second electrode of a memristor through a column line, the memristor having a first electrode connected to a source electrode of the first transistor of the synapse; and inputting a gating pulse provided by a first control block to a gate electrode of the first transistor through a first control line. One or more of an amplitude, a shape, and a generation time of the first gating pulse may be different from corresponding ones of amplitudes, shapes and generation times of the first and second pulses.

The first pulse may be inputted to a drain electrode of a second transistor connected in parallel to the first transistor, the method may further include inputting a second gating pulse provided by a second control block to a gate electrode of the second transistor through a second control line, and one or more of an amplitude, a shape, and a generation time of the second gating pulse may be different from corresponding ones of the amplitudes, shapes, and generation times of the first and second pulses.

DETAILED DESCRIPTION

Figure 1A:
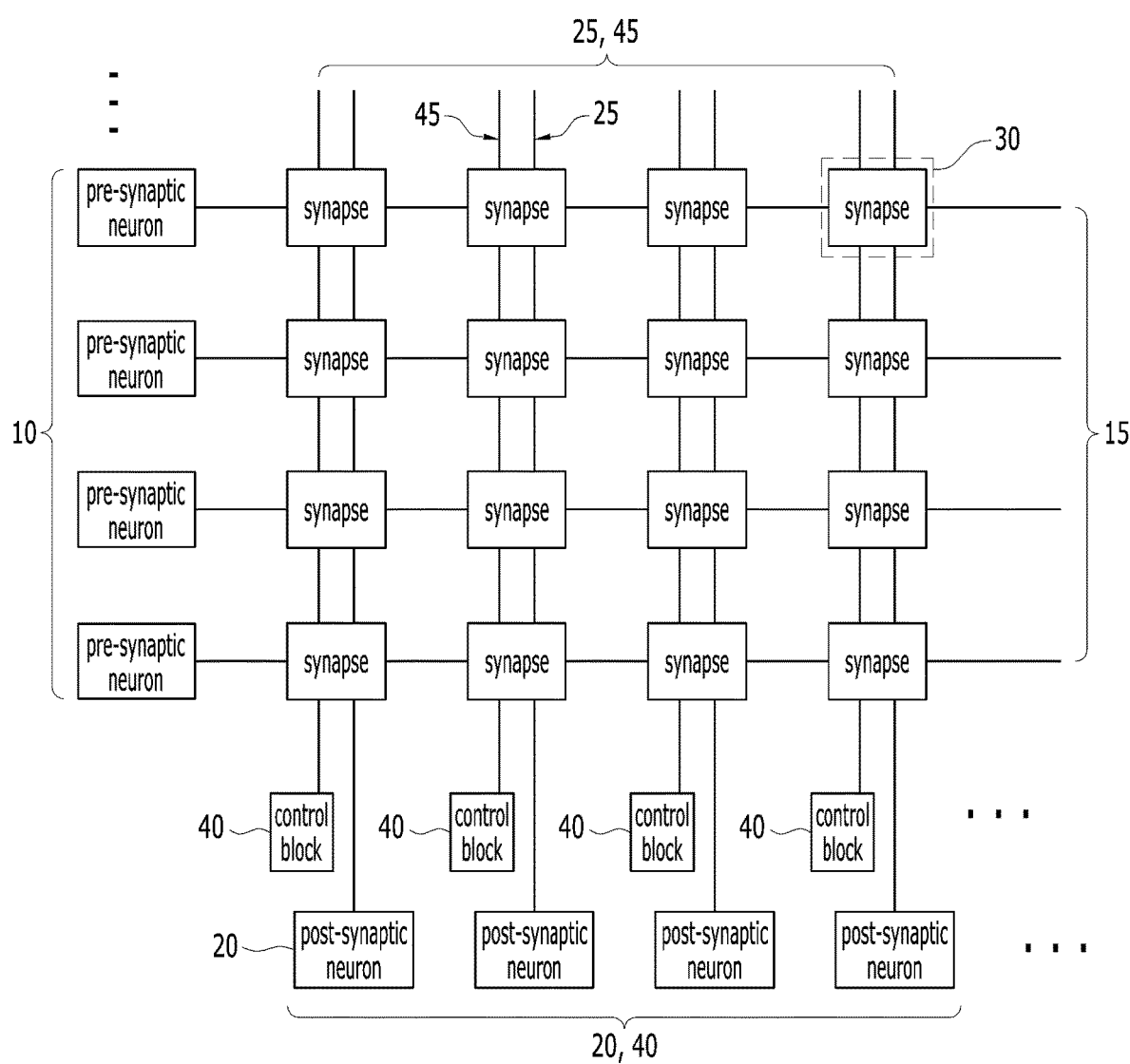
FIG. 1A is a block diagram conceptually illustrating a neuromorphic device in accordance with an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Terms used in this specification are used for describing exemplary embodiments while not limiting the present invention. The terms of a singular form may include plural forms unless referred to the contrary. The meaning of 'comprise' and 'comprising' used in the specification specifies a component, step, operation, and/or element but does not exclude other components, steps, operations, and/or elements.

When one element is referred to as being 'connected to' or 'coupled to' another element, it may indicate that the former element is directly connected or coupled to the latter element or another element is interposed therebetween. On the other hand, when one element is referred to as being 'directly connected to' or 'directly coupled to' another element, it may indicate that no element is interposed therebetween. Furthermore, 'and/or' includes each of described items and one or more combinations.

The terms such as 'below', 'beneath', 'lower', 'above' and 'upper', which are spatially relative terms, may be used to easily describe the correlation between one element or components and another element or other components as illustrated in the drawings. The spatially relative terms should be understood as terms including different directions of elements during use or operation, in addition to directions illustrated in the drawings. For example, when an element illustrated in the drawings is turned over, the element which is referred to as being 'below' or 'beneath' another element may be positioned above another element.

Throughout the specification, like reference numerals refer to like elements. Therefore, although the same or similar reference numerals are not mentioned or described in the corresponding drawing, the reference numerals may be described with reference to other drawings. Furthermore, although elements are not represented by reference numerals, the elements may be described with reference to other drawings.

In this specification, 'potentiation', 'set', 'training', and 'learning' may be used as the same or similar terms, and 'depressing', 'reset', and 'initiation' may be used as the same or similar terms. For example, an operation of lowering resistance values of synapses may be exemplified as potentiation, setting, training, or learning, and an operation of raising the resistance values of synapses may be exemplified as depressing, resetting, or initiation. Furthermore, when a synapse is potentiated, set, trained, or learned, a gradually increasing voltage/current may be outputted from the synapse because the conductivity of the synapse is increased. When a synapse is depressed, reset, or initiated, a gradually decreasing voltage/current may be outputted from the synapse because the conductivity of the synapse is decreased. For convenience of description, a data pattern, an electrical signal, a pulse, a spike, and a fire may each be interpreted as having the same, similar, or compatible meaning. Furthermore, a voltage and a current may be interpreted as having the same or compatible meaning.

FIG. 1A is a block diagram conceptually illustrating a neuromorphic device in accordance with an embodiment. Referring to FIG. 1, the neuromorphic device in accordance with the present embodiment may include a plurality of pre-synaptic neurons 10, a plurality of post-synaptic neurons 20, a plurality of synapses 30, and a plurality of control blocks 40. The neuromorphic device may further include a plurality of row lines 15, a plurality of column lines 25, and a plurality of control lines 45. Each of the plurality of row lines 15 may electrically connect a corresponding one of the pre-synaptic neurons 10 to a multiplicity of synapses 30, each of the plurality of column lines 25 may electrically connect a corresponding one of the post-synaptic neurons 20 to a multiplicity of synapses 30, and each of the plurality of control lines 45 may connect a corresponding one of the control blocks 40 to a multiplicity of synapses 30. The control lines 45 may be arranged in parallel to the column lines 25. Each of the plurality of synapses 30 may be electrically connected to a corresponding one of the pre-synaptic neurons 10 through a corresponding one of the row lines 15, to a corresponding one of the post-synaptic neurons 20 through a corresponding one of the column lines 25, and to a corresponding one of the control blocks 40 through a corresponding one of the control lines 45.

The pre-synaptic neurons 10 may transmit electrical signals to the synapses 30 through the row lines 15 in a learning mode, reset mode, or reading mode. The post-synaptic neurons 20 may transmit electrical pulses to the synapse 30 through the column lines 25 in the learning mode or the reset mode, and receive electrical signals from the synapses 30 through the column lines 25 in the reading mode. The synapses 30 will be described later in more detail.

The control blocks 40 may provide electrical signals, such as pulses having various shapes and/or amplitudes, to the synapses 30 through the control lines 45 at appropriate times. That is, each of the control blocks 40 may include a pulse generation circuit and a timing controller. In another embodiment, each of the control blocks 40 may be electrically connected to a pulse generation circuit and a timing controller.

Figure 1B:
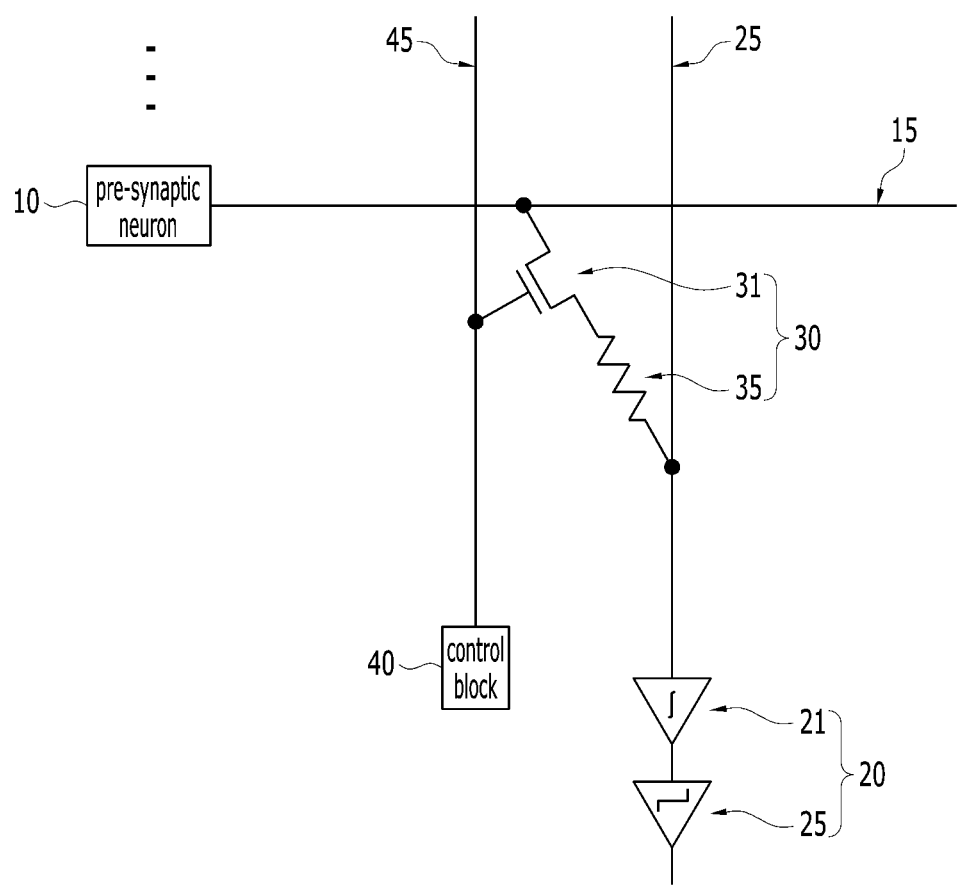
FIG. 1B is a block diagram illustrating a part of the neuromorphic device of FIG. 1A in accordance with an embodiment.

FIG. 1B is a block diagram illustrating a part of the neuromorphic device of FIG. 1A in accordance with an embodiment. Referring to FIG. 1B, the neuromorphic device in accordance with the present embodiment may include a pre-synaptic neuron 10, a row line 15 extending in a row direction from the pre-synaptic neuron 10, a post-synaptic neuron 20, a column line 25 extending in a column direction from the post-synaptic neuron 20, a synapse 30 disposed at an intersection between the row line 15 and the column line 25, a control line 45 extending in parallel to the column line 25, and a control block 40 connected to the control line 45.

The synapse 30 may include a transistor 31 and a memristor 35. The transistor 31 may include a MOS transistor, and the memristor 35 may include a bipolar device such as a variable resistive device. A gate electrode of the transistor 31 may be electrically connected to the control block 40 through the control line 45, a drain electrode thereof may be electrically connected to the pre-synaptic neuron 10 through the row line 15, and a source electrode thereof may be electrically connected to a first electrode of the memristor 35. A second electrode of the memristor 35 may be electrically connected to the post-synaptic neuron 20 through the column line 25. Thus, the memristor 35 of the synapse 30 may be potentiated or depressed by electrical signals provided from the pre-synaptic neuron 10, the post-synaptic neuron 20, and the control block 40.

The post-synaptic neuron 20 may include an Integrate-And-Fire (INF) circuit. For example, the post-synaptic neuron 20 may include an integrator 21 and a comparator 25. The integrator 21 may have an input terminal connected to the second electrode of the memristor 35 of the synapse 30 through the column line 25, and the comparator 25 may have an input terminal connected to an output terminal of the integrator 21.

FIGS. 2A to 3C are timing diagrams conceptually describing methods for training synapses in accordance with various embodiments. In order to clearly and easily describe a technical idea of the present embodiment, the drawings are based on the presupposition that a pre-synaptic pulse P1 and a post-synaptic pulse P2 are provided to a synapse 30 at the same pulse time tp, and have durations D1 and D2, respectively, which are equal to each other (D1=D2). Furthermore, the drawings are based on the presupposition that the pre-synaptic pulse P1 has a relatively high voltage, for example, a positive (+) voltage, and the post-synaptic pulse P2 has a relatively low voltage, for example, a negative (−) voltage. The pre-synaptic pulse P1 and the post-synaptic pulse P2 have amplitudes A1 and A2, respectively. In various extended embodiments, the pre-synaptic pulse P1 and the post-synaptic pulse P2 may have different voltages. For example, in an embodiment, the pre-synaptic pulse P1 has the relatively low voltage, for example, the negative (−) voltage, and the post-synaptic pulse P2 has the relatively high voltage, for example, the positive (+) voltage.

Figure 2A:
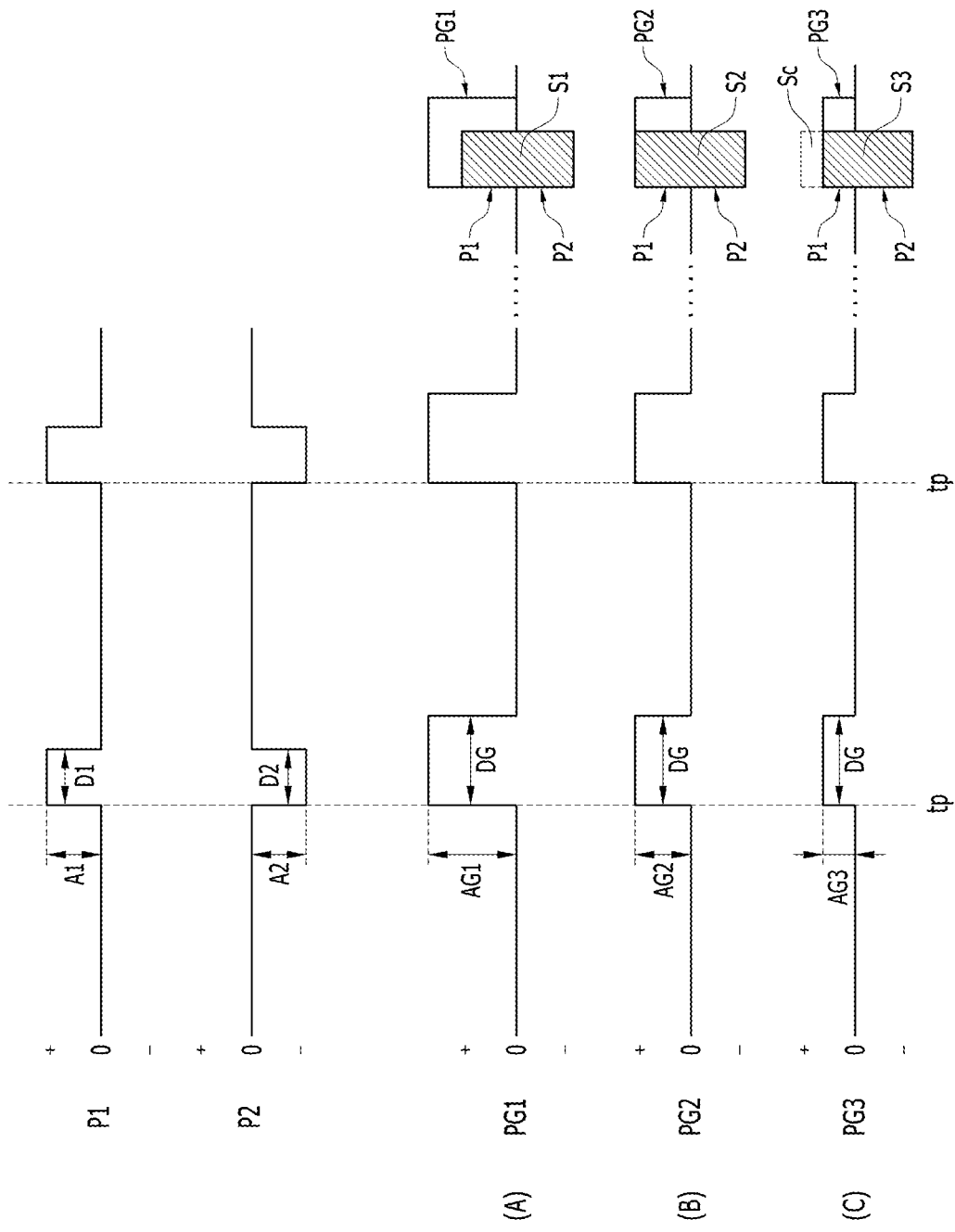
FIGS. 2A to 3C are timing diagrams conceptually describing methods for training synapses in accordance with various embodiments.

FIG. 2A illustrates a method of adjusting a resistance change ratio of the memristor 35 of the synapse 30 by selectively providing rectangular gating pulses PG1 to PG3 having various amplitudes to the gate electrode of the transistor 31 of the synapse 30. The rectangular gating pulses PG1 to PG3 have the same polarity, e.g., positive (+) voltages, as the pre-synaptic pulse P1.

Referring to FIG. 2A, at the pulse time tp, the pre-synaptic pulse P1 may be provided to the drain electrode of the transistor 31 of the synapse 30 from the pre-synaptic neuron 10, the post-synaptic pulse P2 may be provided to the second electrode of the memristor 35 of the synapse 30 from the post-synaptic neuron 20, and the rectangular gating pulses PG1 to PG3 having various amplitudes AG1 to AG3, respectively, may be selectively provided to the gate electrode of the transistor 31 of the synapse 30 from the control block 40. FIG. 2A is based on the presupposition that the gating pulses PG1 to PG3 are selectively generated at the pulse time tp and have the same duration DG.

Referring to (A) of FIG. 2A, the first gating pulse PG1 may have an amplitude AG1 that is larger than the amplitude A1 of the pre-synaptic pulse P1 (A1<AG1). Thus, an overlap region S1 between the first gating pulse PG1 and an overlay of the pulses P1 and P2 may have the same area as the overlay of the pre-synaptic pulse P1 and the post-synaptic pulse P2.

Referring to (B) of FIG. 2A, the second gating pulse PG2 may have the same amplitude AG2 as the amplitude A1 of the pre-synaptic pulse P1 (A1=AG2). Thus, an overlap region S2 between the second gating pulse PG2 and the overlay of the pulses P1 and P2 may have the same area as the overlay of the pre-synaptic pulse P1 and the post-synaptic pulse P2.

When the amplitudes AG1 and AG2 of the gating pulses PG1 and PG2 are equal to or larger than the amplitude A1 of the pre-synaptic pulse P1, the maximum value, which corresponds to the overlay of the pre-synaptic pulse P1 and the post-synaptic pulse P2, may be applied to the memristor 35. Thus, the memristor 35 of the synapse 30 may be potentiated at the maximum resistance change ratio.

On the other hand, referring to (C) of FIG. 2A, the third gating pulse PG3 may have an amplitude AG3 that is smaller than the amplitude A1 of the pre-synaptic pulse P1 (A1>AG3). Thus, an overlap region S3 between the third gating pulse PG3 and the overlay of the pulses P1 and P2 may be smaller than the overlay of the pre-synaptic pulse P1 and the post-synaptic pulse P2 by a cut region Sc. The cut region Sc corresponds to a portion of the pre-synaptic pulse P1 that does not overlap the third gating pulse PG3. Therefore, the memristor 35 of the synapse 30 may have a lower resistance change ratio than when the overlap region between the overlay of the pulses P1 and P2 and the gating pulse PG has the maximum value.

In accordance with the present embodiment, the amplitudes AG1 to AG3 of the gating pulses PG1 to PG3 may be adjusted to control a current value for potentiating the memristor 35 of the synapse 30. Since the resistance change ratio of the memristor 35 of the synapse 30 can be controlled by adjusting the amplitudes AG1 to AG3 of the gating pulses PG1 to PG3, the memristor 35 of the synapse 30 may be delicately trained.

Figure 2B:
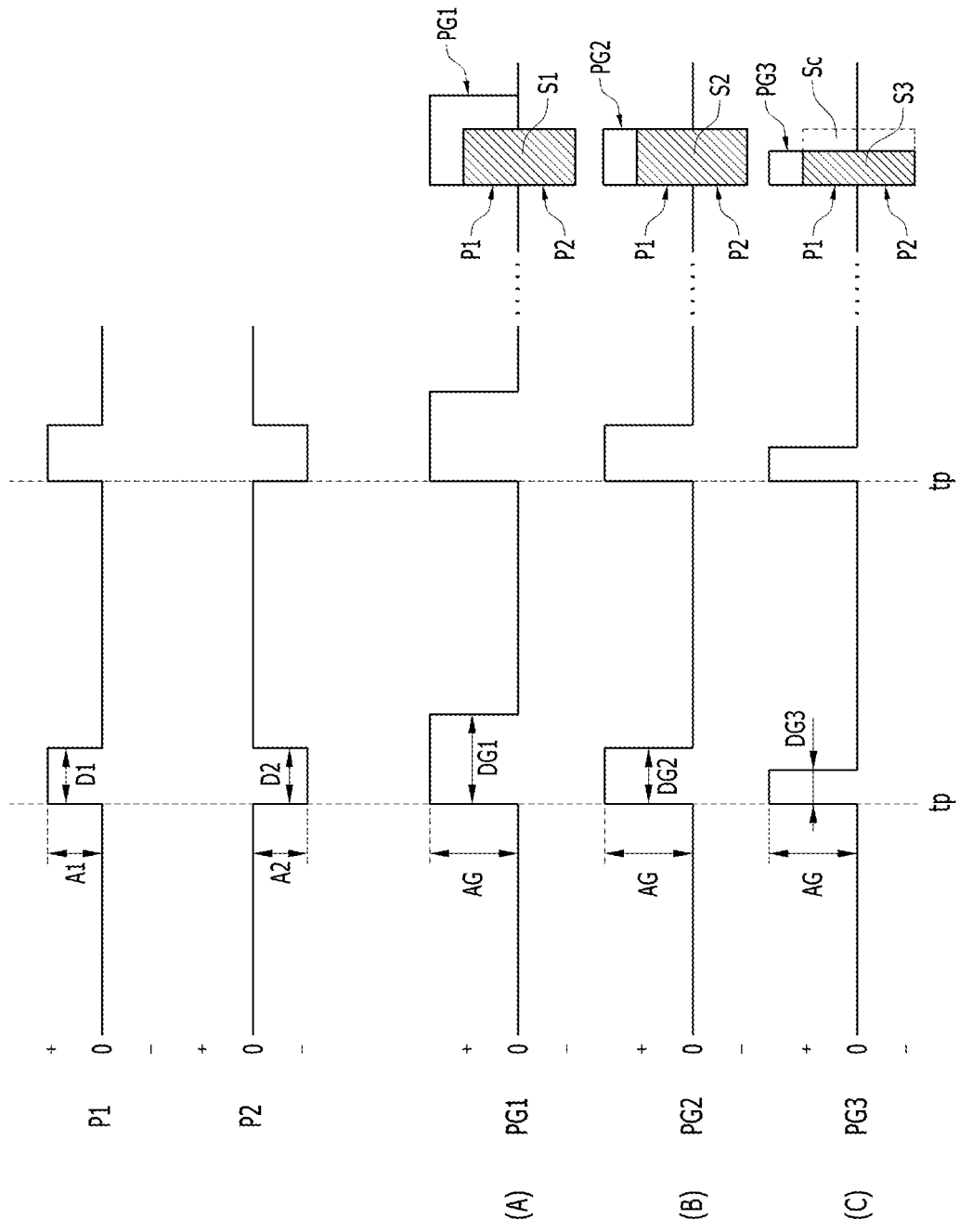

FIG. 2B illustrates a method of adjusting the resistance change ratio of the memristor 35 of the synapse 30 by selectively providing rectangular gating pulses PG1 to PG3 having various durations to the gate electrode of the transistor 31 of the synapse 30. The method is based on the presupposition that the gating pulses PG1 to PG3 have the same amplitude AG and are generated at the same pulse time tp.

Referring to FIG. 2B, at the pulse time tp, the pre-synaptic pulse P1 may be provided to the drain electrode of the transistor 31 of the synapse 30 from the pre-synaptic neuron 10, the post-synaptic pulse P2 may be provided to the second electrode of the memristor 35 of the synapse 30 from the post-synaptic neuron 20, and the rectangular gating pulses PG1 to PG3 having various durations DG1 to DG3, respectively, may be selectively provided to the gate electrode of the transistor 31 of the synapse 30 from the control block 40.

Referring to (A) of FIG. 2B, the first gating pulse PG1 may have a duration DG1 that is longer than the duration D1 of the pre-synaptic pulse P1 and the duration D2 of the post-synaptic pulse P2 (D1, D2<DG1), and may have the amplitude AG that is larger than amplitudes A1 and A2 of the pre-synaptic pulse P1 and the post-synaptic pulse P2 (A1, A2<AG). Thus, an overlap region S1 between the first gating pulse PG1 and an overlay of the pulses P1 and P2 may have the same area as the overlay of the pre-synaptic pulse P1 and the post-synaptic pulse P2.

Referring to (B) of FIG. 2B, the second gating pulse PG2 may have the same duration DG2 as the duration D1 of the pre-synaptic pulse P1 and the duration D2 of the post-synaptic pulse P2 (D1=D2=DG2), and may have the amplitude AG that is larger than the amplitudes A1 and A2 of the pre-synaptic pulse P1 and the post-synaptic pulse P2 (A1, A2<AG). Thus, an overlap region S2 between the second gating pulse PG2 and the overlay of the pulses P1 and P2 may have the same area as the overlay of the pre-synaptic pulse P1 and the post-synaptic pulse P2. When the durations DG1 and DG2 of the gating pulses PG1 and PG2 are equal to or longer than the duration D1 of the pre-synaptic pulse P1 and the duration D2 of the post-synaptic pulse P2, the maximum value, which corresponds to the overlay of the pre-synaptic pulse P1 and the post-synaptic pulse P2, may be applied to the memristor 35. Thus, the memristor 35 of the synapse 30 may be potentiated at the maximum resistance change ratio.

Referring to (C) of FIG. 2B, the third gating pulse PG3 may have a duration DG3 that is shorter than the duration D1 of the pre-synaptic pulse P1 and the duration D2 of the post-synaptic pulse P2 (D1, D2>DG3), and may have the amplitude AG that is larger than the amplitudes A1 and A2 of the pre-synaptic pulse P1 and the post-synaptic pulse P2 (A1, A2<AG). Thus, an overlap region S3 between the third gating pulse PG3 and the overlay of the pulses P1 and P2 may be smaller than the overlay of the pre-synaptic pulse P1 and the post-synaptic pulse P2 by a cut region Sc. The cut region Sc corresponds to a portion of the overlay of the pre-synaptic pulse P1 and the post-synaptic pulse P2 that does not overlap the third gating pulse PG3. Therefore, in the example illustrated in (C) of FIG. 2B, the memristor 35 of the synapse 30 may be potentiated at a lower resistance change ratio than when the overlap region between the overlay of the pulses P1 and P2 and the gating pulse PG has the maximum value.

In accordance with the present embodiment, the durations DG1 to DG3 of the gating pulses PG1 to PG3 may be adjusted to control a current value for potentiating the memristor 35 of the synapse 30. Since the resistance change ratio of the memristor 35 of the synapse 30 can be controlled by adjusting the durations DG1 to DG3 of the gating pulses PG1 to PG3, the memristor 35 of the synapse 30 may be delicately potentiated.

FIG. 2C illustrates a method of adjusting the resistance change ratio of the memristor 35 of the synapse 30 by selectively providing rectangular gating pulses PG1 to PG3, which are generated at different times t1 to t3, to the gate electrode of the transistor 31 of the synapse 30. The method is based on the presupposition that the gating pulses PG1 to PG3 have the same amplitude AG and the same duration DG. Furthermore, in order to promote understanding of the present embodiment, the method is based on the presupposition that the amplitudes AG of the gating pulses PG1 to PG3 are larger than the amplitude A1 of the pre-synaptic pulse P1 and the amplitude A2 of the post-synaptic pulse P2 (P1, P2<PG1 to PG3), and presupposition that the durations DG of the gating pulses PG1 to PG3 are equal to the duration D1 of the pre-synaptic pulse P1 and the duration D2 of the post-synaptic pulse P2 (D1=D2=DG).

Referring to FIG. 2C, the pre-synaptic pulse P1 may be provided to the drain electrode of the transistor 31 of the synapse 30 from the pre-synaptic neuron 10, and the post-synaptic pulse P2 may be provided to the second electrode of the memristor 35 of the synapse 30 from the post-synaptic neuron 20, at the same pulse time tp. On the other hand, the rectangular gating pulses PG1 to PG3 may be provided to the gate electrode of the transistor 31 of the synapse 30 from the control block 40, at the different times t1 to t3, respectively.

Referring to (A) of FIG. 2C, the first gating pulse PG1 may be provided to the gate electrode of the transistor 31 of the synapse 30 at an earlier time t1 than the pulse time tp, at which the pre-synaptic pulse P1 and the post-synaptic pulse P2 are provided to the transistor 31 of the synapse 30 and the memristor 35 of the synapse 30, respectively. Thus, an overlap region S1 between the first gating pulse PG1 and an overlay of the pulses P1 and P2 may be smaller than the overlay of the pre-synaptic pulse P1 and the post-synaptic pulse P2 by a cut region Sc1. The cut region Sc1 corresponds to a portion of the overlay of the pre-synaptic pulse P1 and the post-synaptic pulse P2 that does not overlap the first gating pulse PG1.

Referring to (B) of FIG. 2C, the second gating pulse PG2 may be provided to the gate electrode of the transistor 31 of the synapse 30 at the same time t2 as the pulse time tp, at which the pre-synaptic pulse P1 and the post-synaptic pulse P2 are provided to the transistor 31 of the synapse 30 and the memristor 35 of the synapse 30, respectively. Thus, an overlap region S2 between the second gating pulse PG2 and the overlay of the pulses P1 and P2 may have the same area as the overlay of the pre-synaptic pulse P1 and the post-synaptic pulse P2.

Referring to (C) of FIG. 2C, the third gating pulse PG3 may be provided to the gate electrode of the transistor 31 of the synapse 30 at a later time t3 than the pulse time tp, at which the pre-synaptic pulse P1 and the post-synaptic pulse P2 are provided to the transistor 31 of the synapse 30 and the memristor 35 of the synapse 30, respectively. Thus, an overlap region S3 between the third gating pulse PG3 and the overlay of the pulses P1 and P2 may have a smaller area by a cut region Sc2 than the overlay of the pre-synaptic pulse P1 and the post-synaptic pulse P2. The cut region Sc2 corresponds to a portion of the overlay of the pre-synaptic pulse P1 and the post-synaptic pulse P2 that does not overlap the third gating pulse PG1.

In accordance with the present embodiment, the times t1 to t3, at which the gating pulses PG1 to PG3 are generated and provided to the gate electrode of the transistor 31 of the synapse 30, respectively, may be adjusted to control a current value for potentiating the memristor 35 of the synapse 30. Since the resistance change ratio of the memristor 35 of the synapse 30 can be controlled by adjusting the times t1 to t3, at which the gating pulses PG1 to PG3 are provided to the gate electrode of the transistor 31 of the synapse 30, respectively, the memristor 35 of the synapse 30 may be delicately potentiated.

Figure 3A:
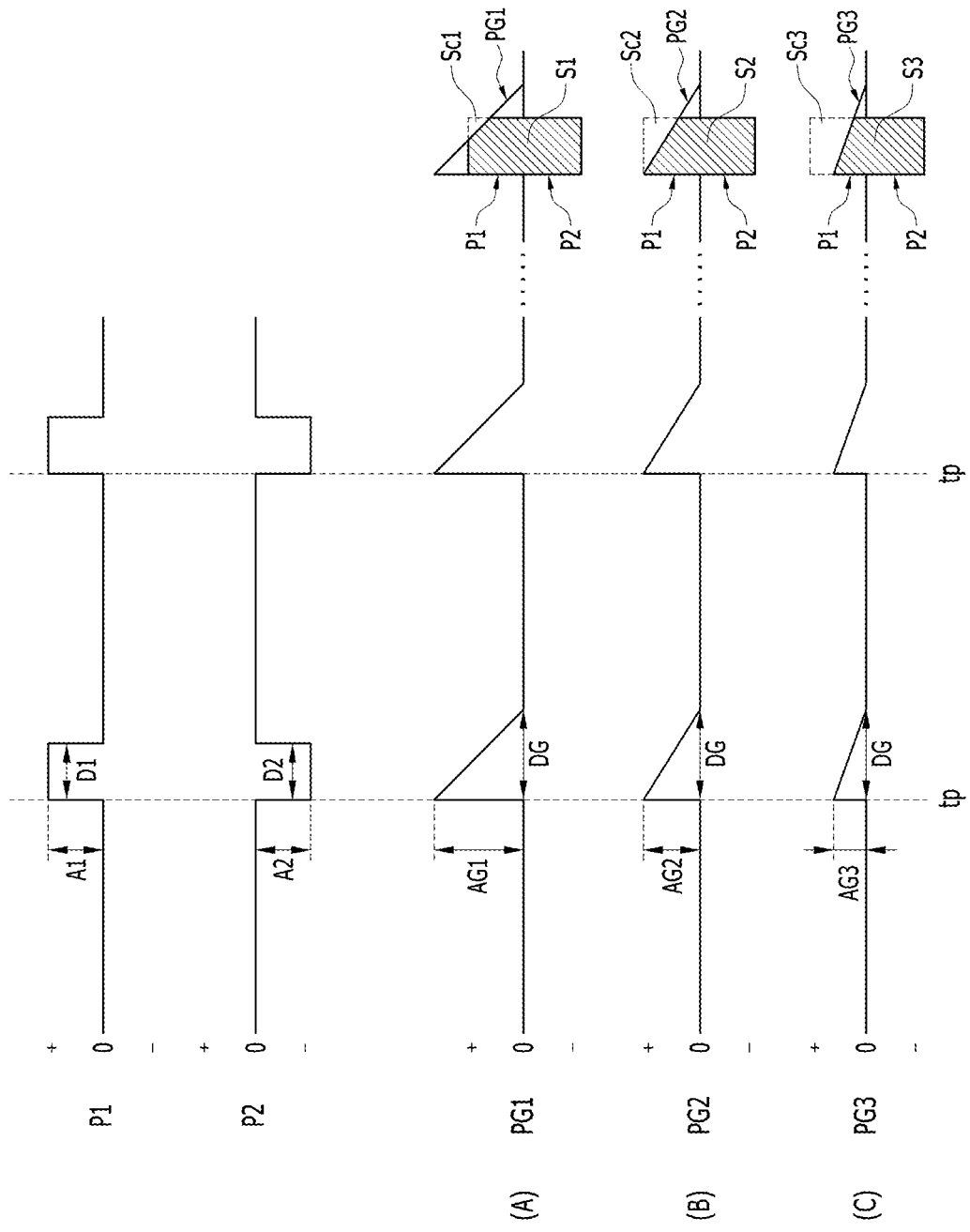

FIG. 3A illustrates a method of adjusting the resistance change ratio of the memristor 35 of the synapse 30 by selectively providing triangular gating pulses PG1 to PG3 having various amplitudes to the gate electrode of the transistor 31 of the synapse 30. The triangular gating pulses PG1 to PG3 have the same polarity, e.g., positive (+) voltages, as the pre-synaptic pulse P1.

Referring to FIG. 3A, at the pulse time tp, the rectangular pre-synaptic pulse P1 may be provided to the drain electrode of the transistor 31 of the synapse 30 from the pre-synaptic neuron 10, the rectangular post-synaptic pulse P2 may be provided to the second electrode of the memristor 35 of the synapse 30 from the post-synaptic neuron 20, and the triangular gating pulses PG1 to PG3 having various amplitudes AG1 to AG3 may be selectively provided to the gate electrode of the transistor 31 of the synapse 30 from the control block 40. FIG. 3A is based on the presupposition that the gating pulses PG1 to PG3 are selectively generated at the same pulse time tp and have the same duration DG.

Referring to (A) of FIG. 3A, the first gating pulse PG1 may have the maximum amplitude AG1 that is larger than the amplitude A1 of the pre-synaptic pulse P1 (A1<AG1). Thus, an overlap region S1 between an overlay of the pulses P1 and P2 and the first gating pulse PG1 may have a smaller area by a cut region Sc1 than the overlay of the pre-synaptic pulse P1 and the post-synaptic pulse P2. The cut region Sc1 corresponds to a portion of the pre-synaptic pulse P1 that does not overlap the first gating pulse PG1.

Referring to (B) of FIG. 3A, the second gating pulse PG2 may have the maximum amplitude AG2 that is the same as the amplitude A1 of the pre-synaptic pulse P1 (A1=AG2). Thus, an overlap region S2 between the overlay of the pulses P1 and P2 and the second gating pulse PG2 may have a smaller area by a cut region Sc2 than the overlay of the pre-synaptic pulse P1 and the post-synaptic pulse P2. The cut region Sc2 corresponds to a portion of the pre-synaptic pulse P1 that does not overlap the second gating pulse PG2.

Referring to (C) of FIG. 3A, the third gating pulse PG3 may have the maximum amplitude AG3 that is smaller than the amplitude A1 of the pre-synaptic pulse P1 (A1>AG3). Thus, an overlap region S3 between the overlay of the pulses P1 and P2 and the third gating pulse PG3 may be smaller than the overlay of the pre-synaptic pulse P1 and the post-synaptic pulse P2 by a cut region Sc3. The cut region Sc3 corresponds to a portion of the pre-synaptic pulse P1 that does not overlap the third gating pulse PG3. The cut region Sc3 is larger than the cut region Sc2, and the cut region Sc2 is larger than the cut region Sc1.

In accordance with the present embodiment, the shapes and amplitudes AG1 to AG3 of the gating pulses PG1 to PG3 may be adjusted to control a current value for potentiating the memristor 35 of the synapse 30. Since the resistance change ratio of the memristor 35 of the synapse 30 can be controlled by adjusting the shapes and amplitudes AG1 to AG3 of the gating pulses PG1 to PG3, the memristor 35 of the synapse 30 may be delicately potentiated.

FIG. 3B illustrates a method of adjusting the resistance change ratio of the memristor 35 of the synapse 30 by selectively providing triangular gating pulses PG1 to PG3 having various durations to the gate electrode of the transistor 31 of the synapse 30.

Referring to FIG. 3B, at the pulse time tp, the pre-synaptic pulse P1 may be provided to the drain electrode of the transistor 31 of the synapse 30 from the pre-synaptic neuron 10, the post-synaptic pulse P2 may be provided to the second electrode of the memristor 35 of the synapse 30 from the post-synaptic neuron 20, and the triangular gating pulses PG1 to PG3 having different durations DG1 to DG3 may be selectively provided to the gate electrode of the transistor 31 of the synapse 30 from the control block 40. FIG. 3B is based on the presupposition that the gating pulses PG1 to PG3 have the same maximum amplitude AG and are selectively generated at the pulse time tp.

Referring to (A) to (C) of FIG. 3B, overlap regions S1 to S3 between an overlay of the pulses P1 and P2 and the gating pulses PG1 to PG3, respectively, may have smaller areas by cut regions Sc1 to Sc3 than the overlay of the pre-synaptic pulse P1 and the post-synaptic pulse P2, respectively, according to the different durations DG1 to DG3 of the triangular gating pulses PG1 to PG3. Thus, the memristor 35 of the synapse 30 may have a lower resistance change ratio than when the overlap region between the overlay of the pulses P1 and P2 and the gating pulse PG corresponds to the overlay of the pre-synaptic pulse P1 and the post-synaptic pulse P2.

In accordance with the present embodiment, the durations DG1 to DG3 of the gating pulses PG1 to PG3 may be adjusted to control a current value for potentiating the memristor 35 of the synapse 30. Since the resistance change ratio of the memristor 35 of the synapse 30 can be controlled by adjusting the durations DG1 to DG3 of the gating pulses PG1 to PG3, the memristor 35 of the synapse 30 may be delicately potentiated.

Figure 3C:
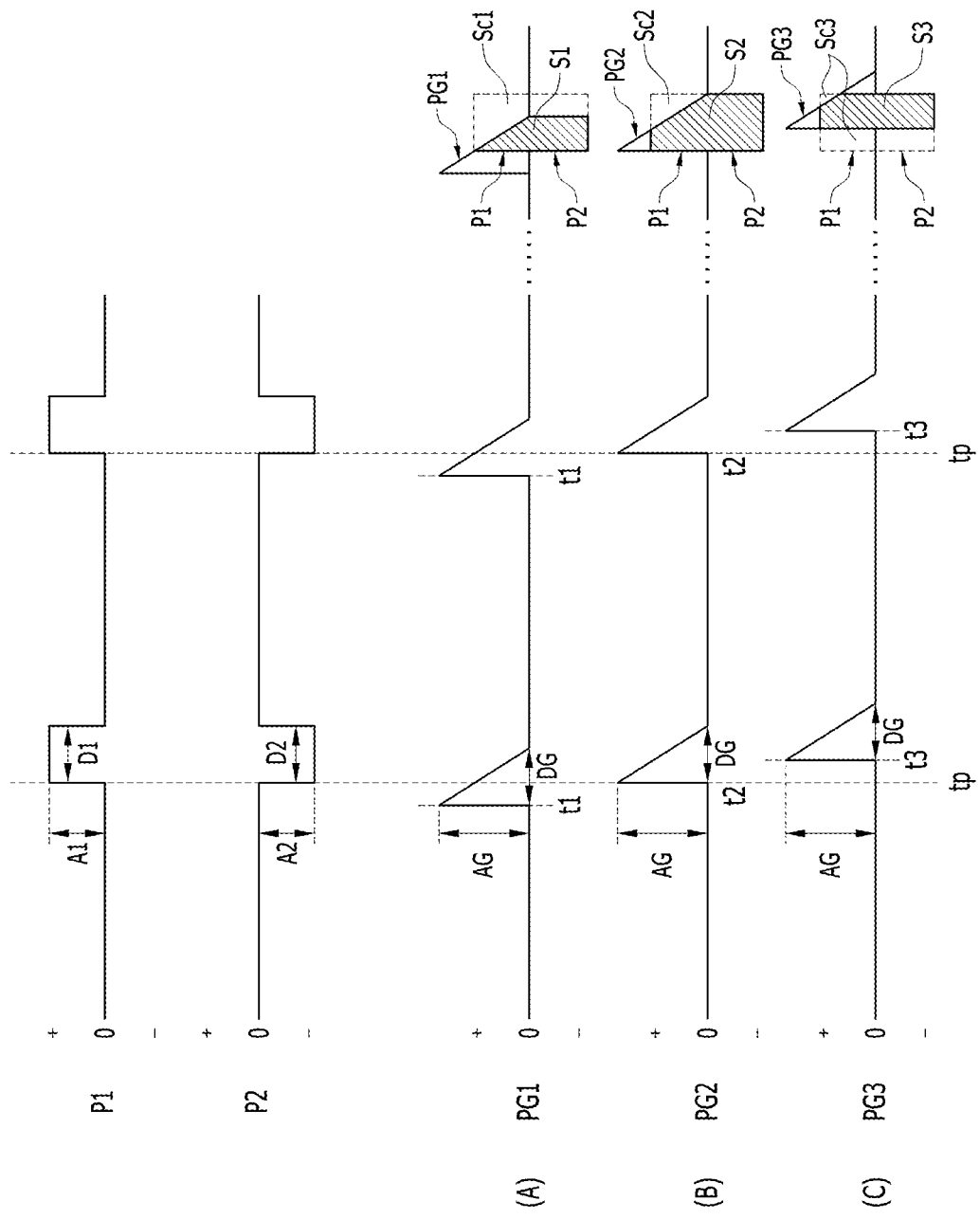

FIG. 3C illustrates a method of adjusting the resistance change ratio of the memristor 35 of the synapse 30 by selectively providing triangular gating pulses PG1 to PG3, which are generated at different times t1 to t3, respectively, to the gate electrode of the transistor 31 of the synapse 30. The method is based on the presupposition that the gating pulses PG1 to PG3 have the same maximum amplitude AG and the same duration DG. Furthermore, in order to promote understanding of the present embodiment, the method is based on the presupposition that the maximum amplitudes AG of the gating pulses PG1 to PG3 are larger than the amplitude A1 of the pre-synaptic pulse P1 and the amplitude A2 of the post-synaptic pulse P2, and the presupposition that the durations DG of the gating pulses PG1 to PG3 are equal to the duration D1 of the pre-synaptic pulse P1 and the duration D2 of the post-synaptic pulse P2.

Referring to FIG. 3C, at the pulse time tp, the pre-synaptic pulse P1 may be provided to the drain electrode of the transistor 31 of the synapse 30 from the pre-synaptic neuron 10, and the post-synaptic pulse P2 may be provided to the second electrode of the memristor 35 of the synapse 30 from the post-synaptic neuron 20. On the other hand, the triangular gating pulses PG1 to PG3 may be selectively provided to the gate electrode of the transistor 31 of the synapse 30 from the control block 40, at the different points of time t1 to t3, respectively.

Referring to (A) to (C) of FIG. 3C, overlap regions S1 to S3 between an overlay of the pulses P1 and P2 and the gating pulses PG1 to PG3, respectively, may be smaller than the overlay of the pre-synaptic pulse P1 and the post-synaptic pulse P2 by cut regions Sc1 to Sc3, respectively, according to the different times t1 to t3 at which the triangular gating pulses PG1 to PG3 are provided to the gate electrode of the transistor 31 of the synapse 30. Thus, in (A) to (C) of FIG. 3C, the memristor 35 of the synapse 30 may have a lower resistance change ratio than when the overlap region between the overlay of the pulses P1 and P2 and the gating pulse PG corresponds to the overlay of the pre-synaptic pulse P1 and the post-synaptic pulse P2.

In accordance with the present embodiment, the times t1 to t3, at which the gating pulses PG1 to PG3 are generated and provided to the gate electrode of the transistor 31 of the synapse 30, respectively, may be adjusted to control a current value for potentiating the memristor 35 of the synapse 30. Since the resistance change ratio of the memristor 35 of the synapse 30 can be controlled by adjusting the times t1 to t3 of the gating pulses PG1 to PG3, the memristor 35 of the synapse 30 may be delicately potentiated.

In an embodiment, the post-synaptic pulse P2 may have a lower positive (+) voltage than the pre-synaptic pulse P1 having a positive (+) voltage in order to potentiate the memristor 35 of the synapse 30. In an embodiment, the pre-synaptic pulse P1 may have a lower negative (−) voltage than the post-synaptic pulse P2, in order to depress the memristor 35 of the synapse 30. That is, an absolute value of the negative voltage of the post-synaptic pulse P2 may be smaller than an absolute value of the negative voltage of the pre-synaptic pulse P1.

In accordance with the present embodiments, the resistance change ratio of the memristor 35 of the synapse 30 may be adjusted in various manners depending on the shapes, amplitudes, and generation times of the gating pulses PG provided to the gate electrode of the transistor 31 of the synapse 30.

Figure 4:
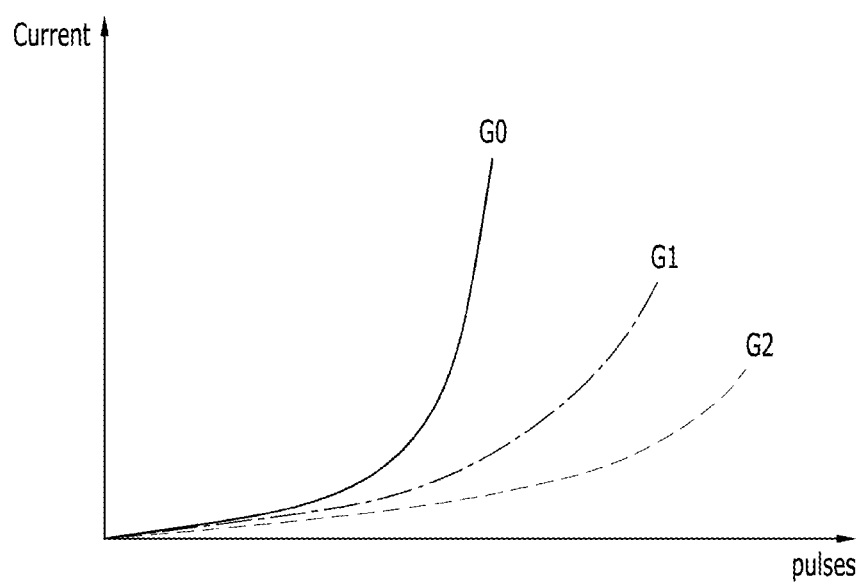
FIG. 4 is a graph conceptually illustrating the magnitude of a current provided to a memristor of a synapse per the number of pre-synaptic pulses and/or post-synaptic pulses in various embodiments.

FIG. 4 is a graph conceptually illustrating magnitudes of currents provided to the memristor 35 of the synapse 30 per the number of pre-synaptic pulses P1 and/or post-synaptic pulses P2 in accordance with various embodiments. Referring to FIG. 4, when the pre-synaptic pulses P1 and/or the post-synaptic pulses P2 are repetitively inputted to the synapse 30, a current flowing through the memristor 35 of the synapse 30 may increase with the number of pulses P1 and P2. That is, as the memristor 35 of the synapse 30 is trained and potentiated, the conductivity of the memristor 35 may increase while a resistance value thereof decreases.

In FIG. 4, a curve G0 represents a current change of the related art, in which a synapse includes only a memristor without a transistor. According to the curve G0, when the synapse is being trained, a current flowing through the memristor rapidly changes.

Each of curves G1 and G2 represents a current change of the memristor 35 of the synapse 30 in accordance with the embodiment. The curve G1 is obtained by inputting a triangular gating pulse PG to the gate electrode of the transistor 31 of the synapse 30 at a pulse time tp, at which the pre-synaptic pulse P1 and the post-synaptic pulse P2 are provided to the synapse 30, and the curve G2 is obtained by inputting a triangular gating pulse PG to the gate electrode of the transistor 31 of the synapse 30 at a time t2 delayed from the pulse time tp, at which the pre-synaptic pulse P1 and the post-synaptic pulse P2 are provided to the synapse 30.

Referring to the curves G1 and G2, the resistance change ratio of the memristor 35 of the synapse 30 may be adjusted by selectively inputting the gating pulses PG having various amplitudes and/or shapes to the gate electrode of the transistor 31 of the synapse 30 at various times. Therefore, the memristor 35 of the synapse 30 may have precise and fine learning levels.

Figure 5A:
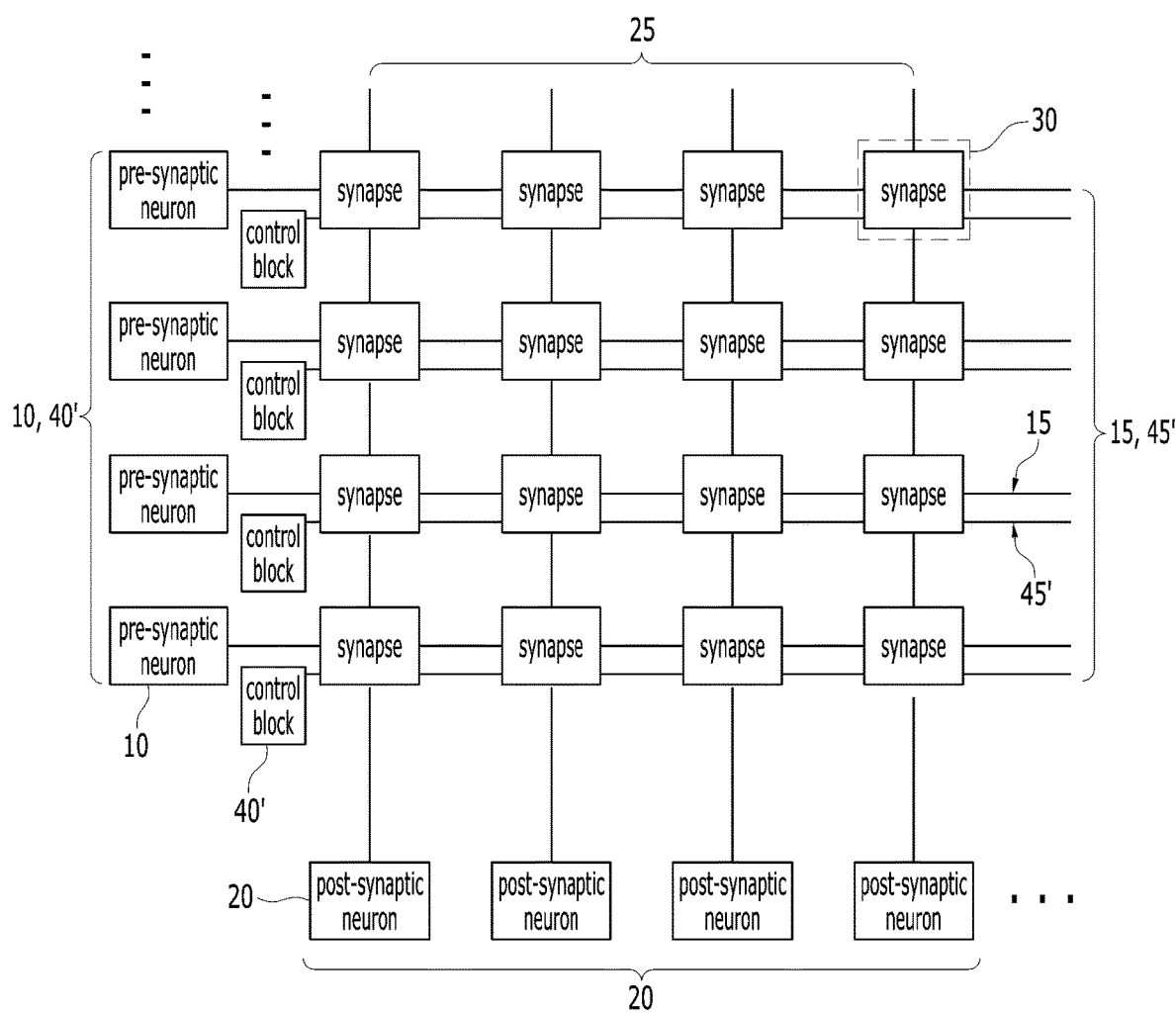
FIG. 5A is a block diagram conceptually illustrating a neuromorphic device in accordance with an embodiment.
Figure 5B:
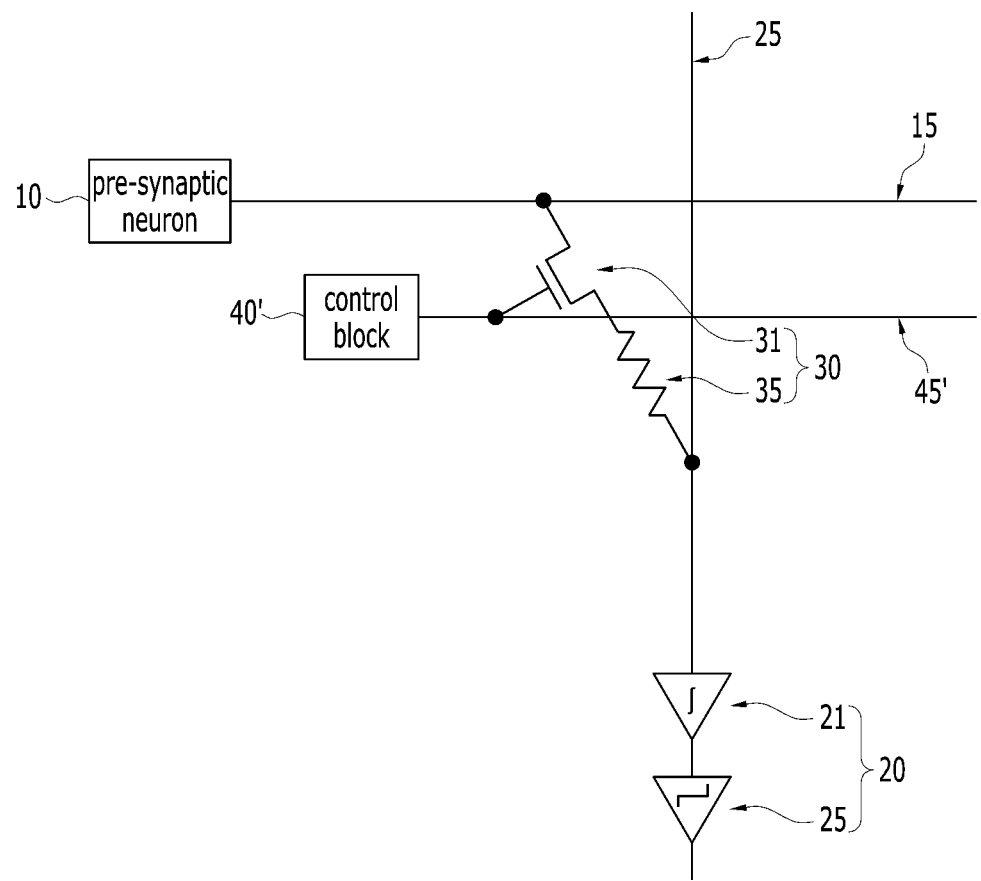
FIG. 5B is a block diagram illustrating a part of the neuromorphic device of FIG. 5A in accordance with an embodiment.

FIG. 5A is a block diagram conceptually illustrating a neuromorphic device in accordance with an embodiment, and FIG. 5B is a block diagram illustrating a part of the neuromorphic device of FIG. 5A in accordance with an embodiment. Referring to FIGS. 5A and 5B, the neuromorphic device in accordance with the present embodiments may include a plurality of pre-synaptic neurons 10, a plurality of post-synaptic neurons 20, a plurality of synapses 30, a plurality of control blocks 40', a plurality of row lines 15, a plurality of column lines 25, and a plurality of control lines 45'.

Each of the row lines 15 may electrically connect a corresponding one of the pre-synaptic neurons 10 to a first multiplicity of synapses 30, each of the column lines 25 may electrically connect a corresponding one of the post-synaptic neurons 20 to a second multiplicity of synapses 30, and each of the control lines 45' may connect a corresponding one of the control blocks 40' to a first multiplicity of synapses 30. The control lines 45' may be arranged in parallel to the row lines 15. That is, a first multiplicity of synapses 30 sharing the same row line 15 may share the same control line 45'. While the control lines 45 in FIGS. 1A and 1B extend in parallel to the column lines 25, the control lines 45' in FIGS. 5A and 5B extend in parallel to the row lines 15, and each of the control lines 45' may be electrically connected to gate electrodes of transistors 31 of a first multiplicity of synapses 30 arranged on the same row line 15.

Figure 6A:
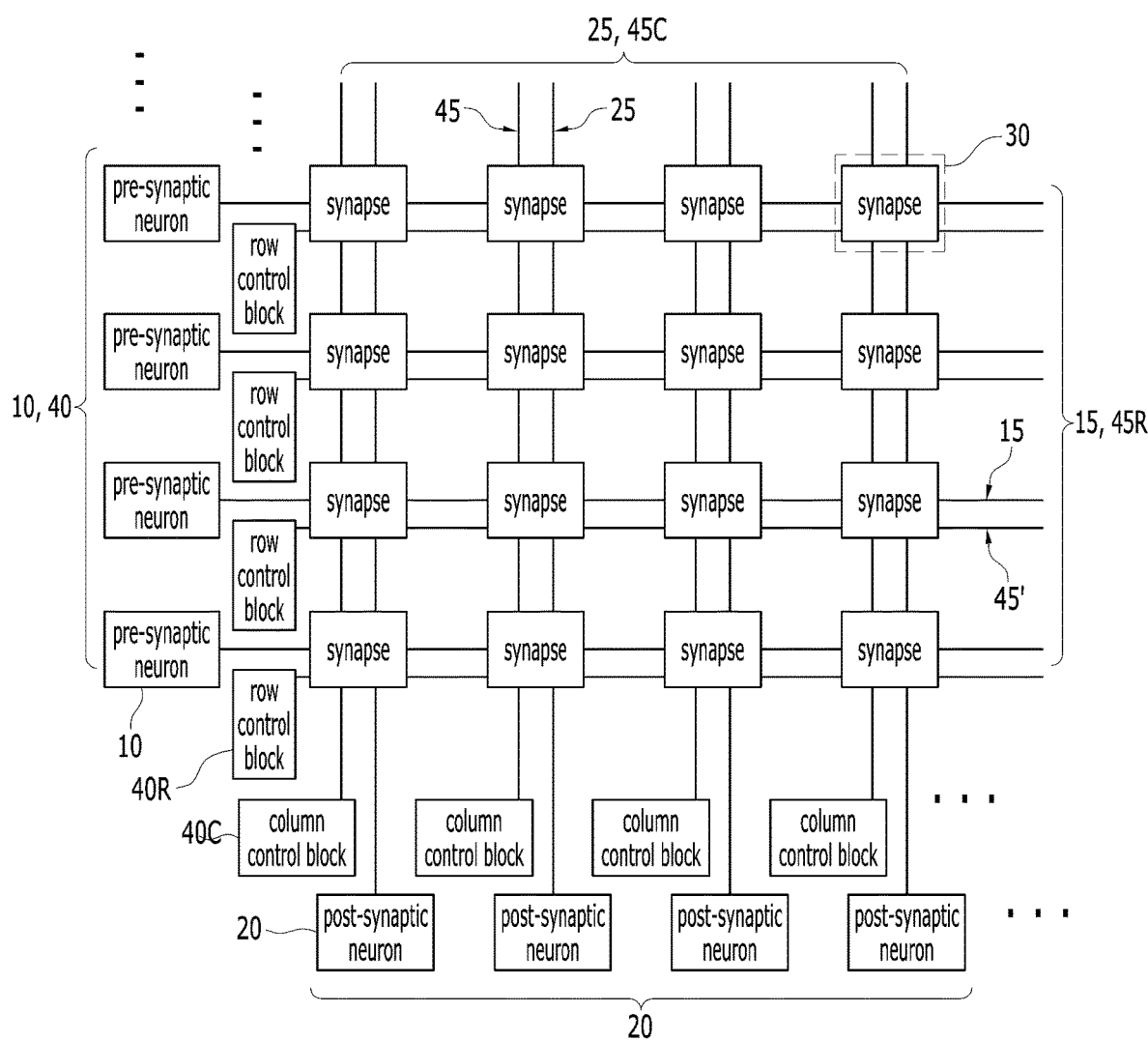
FIG. 6A is a block diagram conceptually illustrating a neuromorphic device in accordance with an embodiment.
Figure 6B:
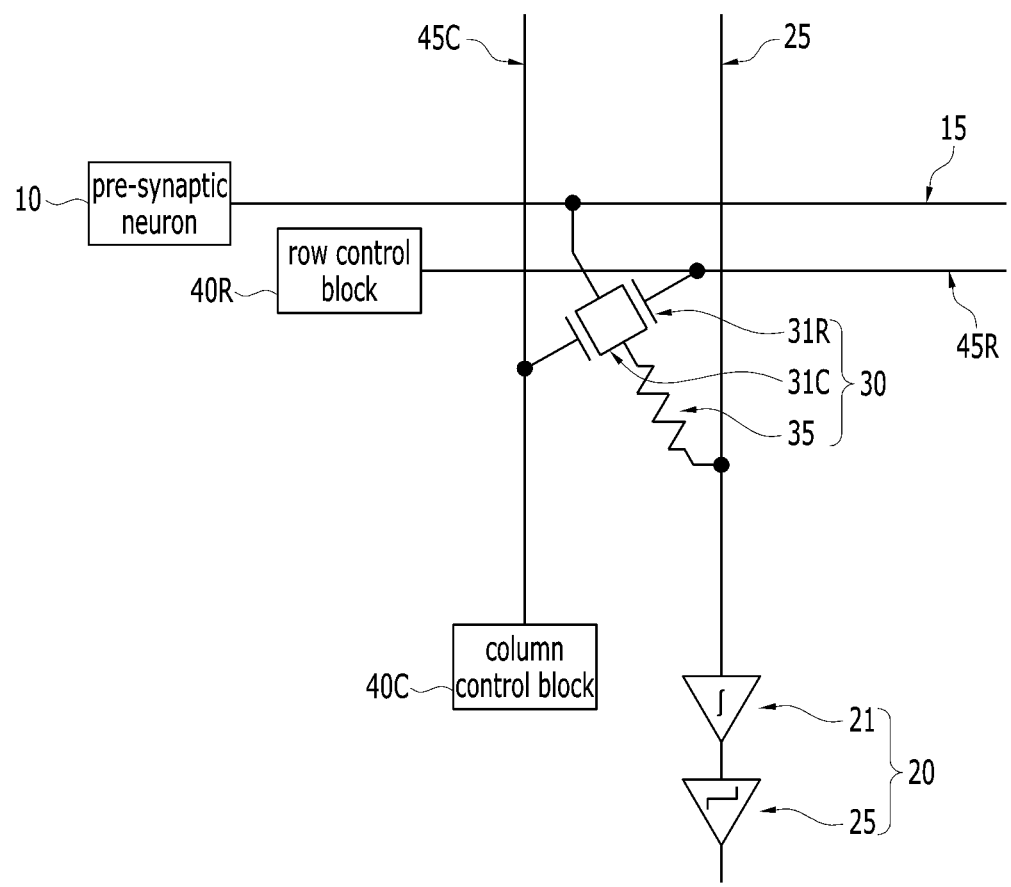
FIG. 6B is a block diagram illustrating a part of the neuromorphic device of FIG. 6A in accordance with an embodiment.

FIG. 6A is a block diagram conceptually illustrating a neuromorphic device in accordance with an embodiment. FIG. 6B is a block diagram illustrating a part of the neuromorphic device of FIG. 6A in accordance with an embodiment.

Referring to FIGS. 6A and 6B, the neuromorphic device in accordance with the present embodiment may include a plurality of pre-synaptic neurons 10, a plurality of post-synaptic neurons 20, a plurality of synapses 30, a plurality of row control blocks 40R, a plurality of row lines 15, a plurality of column control blocks 40C, and a plurality of column lines 25. Each of the plurality of synapses 30 includes two transistors 31R and 31C connected in parallel to each other and a memristor 35 connected in series to the two transistors 31R and 31C. Specifically, a drain electrode of the row transistor 31R and a drain electrode of the column transistor 31C may be electrically connected to each other, and a source electrode of the row transistor 31R and a source electrode of the column transistor 31C may be electrically connected to each other.

The neuromorphic device may further include row control lines 45R connected to gate electrodes of the row transistors 31R of the synapses 30 and column control lines 45C connected to gate electrodes of the column transistors 31C of the synapses 30. The row control lines 45R are arranged in parallel to the row lines 15, and the column control lines 45C are arranged in parallel to the column lines 25.

Thus, gating pulses may be independently inputted to the gate electrodes of the transistors 31R and 31C of the synapses 30 in a row direction and a column direction, respectively.

Figure 7:
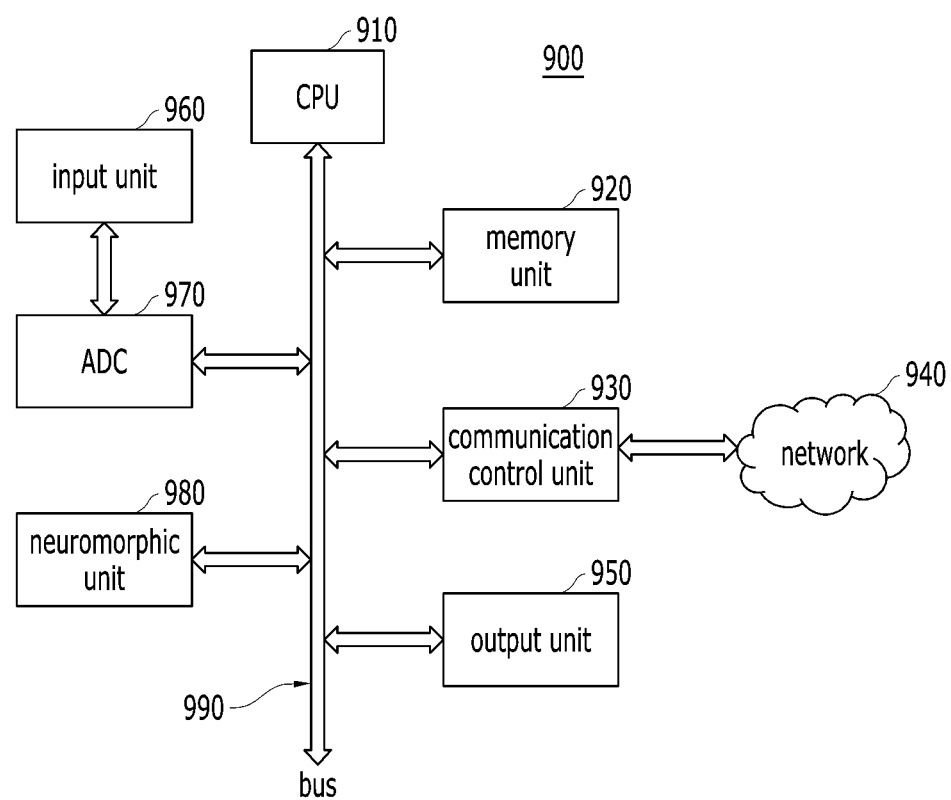
FIG. 7 is a block diagram conceptually illustrating a pattern recognition system in accordance with an embodiment.

FIG. 7 is a block diagram conceptually illustrating a pattern recognition system 900 in accordance with an embodiment. For example, the pattern recognition system 900 may include a speech recognition system, an image recognition system, a code recognition system, a signal recognition system, and a system for recognizing various patterns.

Referring to FIG. 7, the pattern recognition system 900 in accordance with the present embodiment may include a central processing unit (CPU) 910, a memory unit 920, a communication control unit 930, a network 940, an output unit 950, an input unit 960, an analog-digital converter (ADC) 970, a neuromorphic unit 980, and a bus 990.

The CPU 910 may generate and transmit various signals for a learning process to the neuromorphic unit 980, and perform a variety of processes and functions for recognizing patterns such as voices and images according to an output of the neuromorphic unit 980. Synapses in the neuromorphic unit 980 may be trained using the learning process. The CPU 910 may be connected to the memory unit 920, the communication control unit 930, the output unit 950, the ADC 970, and the neuromorphic unit 980 through the bus 990.

The memory unit 920 may store information in accordance with operations of the pattern recognition system 900. The memory unit 920 may include one or more of a volatile memory device such as DRAM or SRAM, a nonvolatile memory device such as PRAM, MRAM, ReRAM, or NAND flash memory, and a memory unit such as a HDD (Hard Disk Drive) or a SSD (Solid State Drive).

The communication control unit 930 may transmit and/or receive data such as a recognized voice and image to and/or from a communication control unit of another system through the network 940.

The output unit 950 may output the data such as the recognized voice and image using various methods. For example, the output unit 950 may include one or more of various output devices including a speaker, a printer, a monitor, a display a panel, a beam projector, a hologrammer, and so on.

The input unit 960 may include one or more of a microphone, a camera, a scanner, a touch pad, a keyboard, a mouse, a mouse pen, a sensor, and so on.

The ADC 970 may convert analog data transmitted from the input unit 960 into digital data.

The neuromorphic unit 980 may perform learning and recognition using the data transmitted from the ADC 970, and output data corresponding to a recognized pattern. The neuromorphic unit 980 may include one or more of the neuromorphic devices in accordance with the various embodiments.

In accordance with the various embodiments of the present disclosure, the synapses of the neuromorphic devices may have multiple resistance levels according to the adjusted resistance change ratios. Thus, learning and recognition of the synapses can be delicately performed.

Although various embodiments have been described for illustrative purposes, it will be apparent to those skilled in the art that various changes and modifications may be made without departing from the spirit and scope of the invention as defined in the following claims.

What is claimed is:

1. A method of adjusting a resistance change ratio of a neuromorphic device, the method comprising:
   inputting a first pulse provided by a pre-synaptic neuron to a drain electrode of a transistor of a synapse through a row line;
   inputting a second pulse provided by a post-synaptic neuron to a second electrode of a memristor through a column line, the memristor having a first electrode connected to a source electrode of the transistor of the synapse; and
   inputting a gating pulse provided by a control block to a gate electrode of the transistor through a control line,
   wherein a shape and an amplitude of the gating pulse are adjusted to control a resistance change ratio of the memristor of the synapse.

2. The method of claim 1, wherein the gating pulse has a rectangular shape.

3. The method of claim 2, wherein the gating pulse comprises one of N pulses having different voltage levels from the first pulse, N being a positive integer larger than 1.

4. The method of claim 2, wherein the gating pulse comprises one of N pulses having different generation times from the first pulse.

5. The method of claim 2, wherein the gating pulse comprises one of N pulses having different durations from the first pulse.

6. The method of claim 1, wherein the gating pulse has a triangular shape.

7. The method of claim 6, wherein the gating pulse comprises one of N pulses having different generation times from the first pulse.

8. The method of claim 6, wherein the gating pulse comprises one of N pulses having different maximum voltage levels from the first pulse.

9. The method of claim 6, wherein the gating pulse comprises one of N pulses having different durations from the first pulse.

10. The method of claim 1, wherein the first pulse is inputted to the drain electrode of the transistor at a first time,
    wherein the second pulse is inputted to the second electrode of the memristor at a second time,
    wherein the gating pulse is inputted to the gate electrode of the transistor at a third time, and
    wherein the first pulse, the second pulse, and the gating pulse are input to overlap with one another.

11. A method of adjusting a resistance change ratio of a neuromorphic device, the method comprising:
    inputting a first pulse provided by a pre-synaptic neuron to a drain electrode of a first transistor of a synapse through a row line;
    inputting a second pulse provided by a post-synaptic neuron to a second electrode of a memristor through a column line, the memristor having a first electrode connected to a source electrode of the first transistor of the synapse; and
    inputting a gating pulse provided by a first control block to a gate electrode of the first transistor through a first control line,
    wherein one or more of an amplitude, a shape, and a generation time of the first gating pulse are different from corresponding ones of amplitudes, shapes, and generation times of the first and second pulses.

12. The method of claim 11, wherein the first pulse is inputted to a drain electrode of a second transistor connected in parallel to the first transistor,
    wherein the method further comprises inputting a second gating pulse provided by a second control block to a gate electrode of the second transistor through a second control line, and
    wherein one or more of an amplitude, a shape, and a generation time of the second gating pulse are different from corresponding ones of the amplitudes, shapes, and generation times of the first and second pulses.

13. A method of adjusting a resistance change ratio of a neuromorphic device, the method comprising:
    inputting a first pulse provided by a pre-synaptic neuron to a drain electrode of a first transistor of a synapse through a row line;
    inputting a second pulse provided by a post-synaptic neuron to a second electrode of a memristor through a column line, the memristor having a first electrode connected to a source electrode of the first transistor of the synapse; and inputting a gating pulse provided by a first control block to a gate electrode of the first transistor through a first control line, wherein one or more of an amplitude, a shape, and a generation time of the first gating pulse are different from corresponding ones of amplitudes, shapes, and generation times of the first and second pulses, wherein the first pulse is inputted to a drain electrode of a second transistor connected in parallel to the first transistor, wherein the method further comprises inputting a second gating pulse provided by a second control block to a gate electrode of the second transistor through a second control line, and wherein one or more of an amplitude, a shape, and a generation time of the second gating pulse are different from corresponding ones of the amplitudes, shapes, and generation times of the first and second pulses.

* * * * *